(12) United States Patent
Gupta et al.

(10) Patent No.: US 11,488,164 B2
(45) Date of Patent: Nov. 1, 2022

(54) COMPUTERIZED METHODS AND COMPUTER SYSTEMS FOR VERIFICATION OF TRANSACTIONS

(71) Applicant: Mastercard International Incorporated, Purchase, NY (US)

(72) Inventors: Ashutosh Kumar Gupta, Benares (IN); Tanika Gupta, Gurgaon (IN); Anshul Pandey, Gurgaon (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 153 days.

(21) Appl. No.: 16/213,925

(22) Filed: Dec. 7, 2018

(65) Prior Publication Data
US 2019/0180281 A1   Jun. 13, 2019

(30) Foreign Application Priority Data
Dec. 13, 2017   (SG) .......................... 10201710378V

(51) Int. Cl.
*G06Q 20/40*   (2012.01)
*G06Q 20/20*   (2012.01)
*G07G 5/00*   (2006.01)

(52) U.S. Cl.
CPC ......... *G06Q 20/4014* (2013.01); *G06Q 20/20* (2013.01); *G06Q 20/209* (2013.01); *G06Q 20/4093* (2013.01); *G07G 5/00* (2013.01)

(58) Field of Classification Search
CPC .............................. G06Q 20/401; G06Q 20/20
USPC ......................................................... 705/44
See application file for complete search history.

(56) References Cited

U.S. PATENT DOCUMENTS

| | | | | |
|---|---|---|---|---|
| 9,471,921 | B1* | 10/2016 | Dalit | G06Q 20/22 |
| 11,003,627 | B2* | 5/2021 | Soni | G06F 16/148 |
| 2010/0097180 | A1* | 4/2010 | Cardullo | G07F 7/1008 |
| | | | | 340/5.83 |
| 2013/0218721 | A1* | 8/2013 | Borhan | G06Q 30/0238 |
| | | | | 705/26.41 |

(Continued)

FOREIGN PATENT DOCUMENTS

WO   2013103912 A1   7/2013

OTHER PUBLICATIONS

Hillary Brill/Scott Jones, Little Things and Big Challenges: Information Privacy and the Internet of Things, 2017, Articles—American University Law Review / vol. 66, pp. 1183-1230. (Year: 2017).*

(Continued)

*Primary Examiner* — Benjamin S Brindley
(74) *Attorney, Agent, or Firm* — Jordan IP Law, LLC

(57) ABSTRACT

When a payment transaction made by a user, a reminder data file is created including reminder items associated with the payment transaction. At least one of the reminder items is an image. Subsequently, a transaction statement listing one or more payment transactions is provided to the user, in a form in which each listed payment transaction is associated with an embedded link to the corresponding reminder data file, which permits the user to access the reminder data file. Thus, a user who is unable to recognize a payment transaction on the transaction statement, can use the statement to access the corresponding reminder items, to provide the user with a reminder of the details of the transaction.

17 Claims, 13 Drawing Sheets

(56) References Cited

U.S. PATENT DOCUMENTS

| | | | | |
|---|---|---|---|---|
| 2014/0108173 A1* | 4/2014 | Cooper | ............. | G06Q 20/4014 |
| | | | | 705/18 |
| 2014/0279303 A1* | 9/2014 | van Dam | ............... | G06Q 40/12 |
| | | | | 705/30 |
| 2015/0120547 A1* | 4/2015 | Ghosh | ................ | G06Q 20/4012 |
| | | | | 705/44 |
| 2015/0213560 A1* | 7/2015 | Aabye | ................. | G06Q 20/3278 |
| | | | | 705/21 |
| 2015/0242443 A1* | 8/2015 | Grue | ...................... | G06Q 50/01 |
| | | | | 707/727 |
| 2015/0294373 A1* | 10/2015 | Schuh | ................ | G06Q 30/0276 |
| | | | | 705/14.53 |
| 2016/0042346 A1* | 2/2016 | Pastore | ............ | G06Q 20/40145 |
| | | | | 705/44 |
| 2016/0098705 A1* | 4/2016 | Kurapati | ............... | G06Q 20/341 |
| | | | | 705/41 |
| 2017/0262854 A1* | 9/2017 | Donovan | ......... | G06Q 20/40145 |

OTHER PUBLICATIONS

First Examination Report for India Application No. 201814038139, dated Jun. 18, 2021, 7 pages.

* cited by examiner

| Date | Amount | Payee | Recognize this payment? | |
|---|---|---|---|---|
| 1 Dec 2016 | $24.50 | ABC | NO | ← 702 |
| 10 Dec 2016 | $63.45 | DEF | NO | ← 703 |
| 17 Dec 2016 | $35.59 | GHI | NO | ← 704 |

| Date | Amount | Payee | Recognize this payment? |
|---|---|---|---|
| 1 Dec 2016 | $24.50 | ABC | NO |
| 10 Dec 2016 | $63.45 | DEF | NO |
| 17 Dec 2016 | $35.59 | GHI | |

COMPUTERIZED METHODS AND COMPUTER SYSTEMS FOR VERIFICATION OF TRANSACTIONS

CROSS REFERENCE TO RELATED APPLICATIONS

This application claims priority to Singaporean Application Serial No. 10201710378V, filed Dec. 13, 2017, which is incorporated herein by reference in its entirety

FIELD OF THE INVENTION

The present invention relates to methods and computer systems for assisting an individual (a "user") to review a list of transactions, in particular payment transactions, to verify their authenticity.

BACKGROUND OF THE INVENTION

FIG. 1 illustrates a known payment card network. The computerized network is employed by a number of users, each of whom holds at least one payment card issued by a corresponding issuer bank. The payment card for a given user is associated with a bank account of the user maintained at the issuer bank. In the illustrated network, there is a single user and a single issuer bank for sake of simplicity, but in real payment networks there are many users associated with multiple corresponding issuer banks. Note that the term "bank" is used here in a sense which is not necessarily limited to organizations which are legally constituted as banks, since in some jurisdictions other organizations may be permitted to issue payment cards associated with financial accounts.

When a given user is in a retail location associated with a given merchant (e.g. a shop operated by the merchant), the user can go to a POS (point-of-sales) terminal 101 operated by the merchant to make a purchase of a product. Note that the term "product" is used in this document to include any of physical objects, data products (such as music or software) or services, in addition to the plain and dictionary meaning of the term "product". The POS terminal 101 reads the details of the payment card using a card reader unit 102, and a processor 104 of the POS terminal 101 forms a payment authorization request including payment transaction data. The payment transaction data includes the payment card details and the payment amount. Typically the payment transaction data also includes a time-stamp and a merchant name.

The processor 104 sends the payment authorization request using a communication unit 106 to a server 103 of an acquirer bank at which the merchant maintains an account. The acquirer bank server 103 contacts a payment network server 105 of the payment network, and passes on the payment authorization request. The payment network server 105 uses the payment card details to identify the issuer bank. The payment network server 105 contacts an issuer bank server 107 operated by the issuer bank, and sends the issuer bank server 107 the payment authorization request. The issuer bank server 107 decides either to authorize the purchase, or not to, and sends a corresponding message to the payment network server 105. It also stores the payment transaction data an internal database.

The payment network server passes the message to the acquirer bank server 103, which passes the message back to the POS terminal 101. If the issuer bank server 107 authorized the transaction, then the purchase is now completed. The payment amount (optionally less a handling charge) is credited to the bank account of the merchant by the acquirer bank server 103, and the payment amount (optionally plus a handling charge) is debited from the bank account of the user by the issuer bank server 107. At some later time (during clearing and settlement operations), the issuer bank transfers a corresponding amount of money (e.g. the payment amount) to the acquirer bank.

FIG. 2 shows a second known computerized network. In this network elements having the same meaning as corresponding elements of the first known computerized network are given reference numbers 100 higher. The second known computerized network differs from the first only in that the POS terminal 101 is replaced by a merchant server 215 which operates an online store. The server 215 is in communication with an acquirer bank server 203 which operates a payment account associated with the merchant which operates the merchant server 215. A user, associated with a payment card issued by an issuer bank which operates issuer bank server 207, uses his or her communication device 213 to interact with the online store server 215 via the communication network 211. The communication device 13 may for example be a smart phone, a tablet computer or a PC (desktop or laptop). The online store server 215 is able to control a GUI displayed on a screen of the communication device 213, which may be generated by a browser interacting with a web-interface of the online store server 215, or may be generated by an application running on the communication device 213. When the user instructs a payment, merchant server 215 generates a payment authorization request and sends it to the acquirer bank server 203. The request is processed in the manner explained above with reference to FIG. 1, by the acquirer bank server 203, the payment network server 205 and the issuer bank server 207.

In either case, it is conventional for a payment card user to receive a periodic (e.g. monthly) statement of his or her payment transactions, to allow the user to verify the accuracy of the each of the transactions. The statement is conventionally generated by the issuer bank server 207 using the data in the internal database of payment transaction data, and transmitted to the user. The statement may be transmitted to the user on paper (e.g. by mail), or electronically such as by the user using the communication device 213 to access a web-interface operated by the issuer bank server 207.

Since a single statement may include many tens of transactions, and is typically reviewed at least a month after the earliest transactions were made, it frequently happens that the user does not remember one or more of the transactions in the statement. This problem is exacerbated if a merchant to whom the user thought he was making a payment is in fact an agent for another party, and it is the details of the other party which appear on the payment card statement.

If a user is not able to recognize an item on their billing statement, and is concerned that the item may be fraudulent, the user has initially to contact a customer care department, to initiate a transaction query process. Typically, the customer card department gives the user further details of the transaction. If the user still does not recognize the transaction, he submits a request for the transaction to be cancelled. Typically, this is an involved process managed by the bank which issued the payment card (the "issuer bank"). It may, for example, include the issuer bank contacting the merchant to whom the payment was made. The eventual result of the procedure may be that the issuer bank refuses to give the refund, which gives the user a negative customer experience.

In any case, the process involves considerable costs for the issuer bank which it is unable to pass on.

Furthermore, since the process of verifying a transaction is inconvenient for the user, certain customers will not bother to initiate a transaction query if the payment sum is small, with the result that the payment statement is not sufficiently scrutinized.

SUMMARY OF THE INVENTION

The present invention aims to provide new and useful computer systems and methods performed by computers and computer systems.

Definitions of the invention are given in the appended claims.

As used in this document, the term "payment card" refers to any cashless payment device associated with a payment account, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, transponder devices, NFC-enabled devices, and/or computers. Furthermore, the "payment card" may exist only as a data structure (i.e. without physical existence), which is registered with a digital wallet or cloud wallet.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

BRIEF DESCRIPTION OF THE DRAWINGS

Non-limiting embodiments of the present disclosure will now be described for the sake of example only, with reference to the following drawings in which:

FIG. 7, which is composed of FIGS. 7(*a*) and 7(*b*) shows a transaction statement as it appears at two respective times in the method of FIG. 6;

DETAILED DESCRIPTION OF THE EMBODIMENT

Overview

In general terms, the present disclosure proposes, in an embodiment, that, as part of a payment transaction made by a user, a reminder data file including one or more reminder items is associated with the payment transaction. At least one of the reminder items is an image. The image may include one or more of: an image of a product purchased; an image of the user at the time the purchase was made; an image of a retail location where the product was purchased; or, in the case of an online transaction, a screenshot of at least a portion of an image displayed on a screen of a user device when the purchase was made. The image may be captured by a camera (video camera or still camera) at a retail location, or generated automatically by an online store. Subsequently, a transaction statement listing one or more payment transactions is provided to the user, in a form in which each listed payment transaction is associated with an embedded link to the corresponding reminder data file, which permits the user to access the reminder data file.

Thus, a user who is unable to recognize a payment transaction on the transaction statement, can use the statement to access the corresponding reminder items, to provide the user with a reminder of the details of the transaction.

Since the user is able to access the reminder items, the user is less likely to instigate a transaction query. This means that the costs to the issuer bank and to merchants for handling transaction queries are very much reduced.

Conversely, since the user is able to obtain further information easily relating to any payment transaction the user does not recognize, the user is likely to scrutinize the listed transactions in more detail, and instigate a transaction query in respect of any of the (hopefully rare) transactions for which the reminder data does not remind the user of a transaction.

In cases in which the payment transaction is erroneous or even fraudulent, the reminder data file may provide a way to notice and demonstrate this fact. The reminder data file may also be useful in identifying an individual who has made a fraudulent transaction.

DETAILED DESCRIPTION

Figure 3:
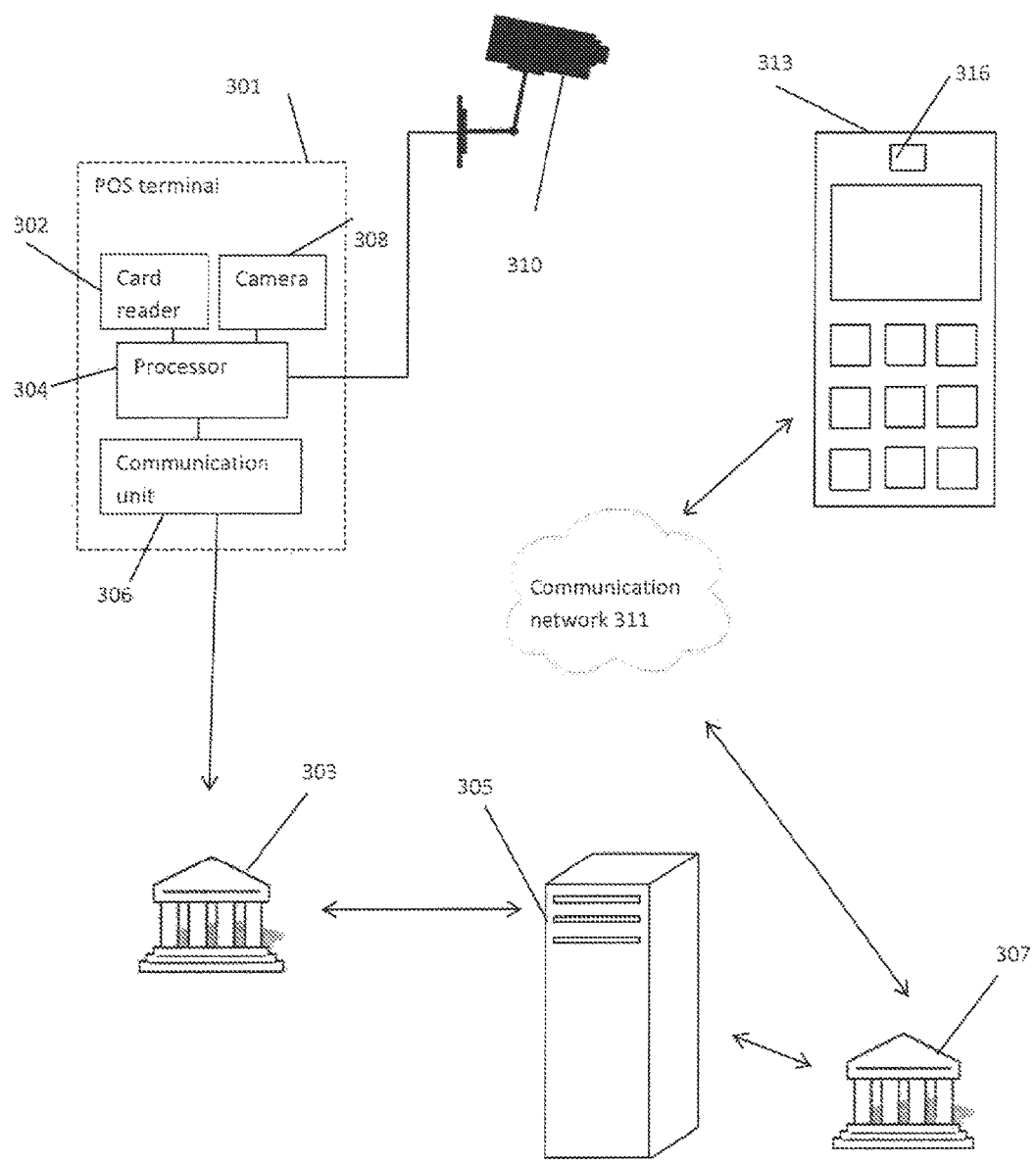
FIG. 3 shows a computerized payment network, in accordance with an embodiment of present disclosure.

Referring to FIG. 3, a computerized network is shown which is an embodiment of the present disclosure, and which is operative to perform a method 600, described below in relation to FIG. 6, which is also an embodiment of the invention. Elements of the computerized network of FIG. 3 having the same meaning as corresponding elements of the computerized network of FIG. 1 are given reference numerals 200 higher.

Figure 1:
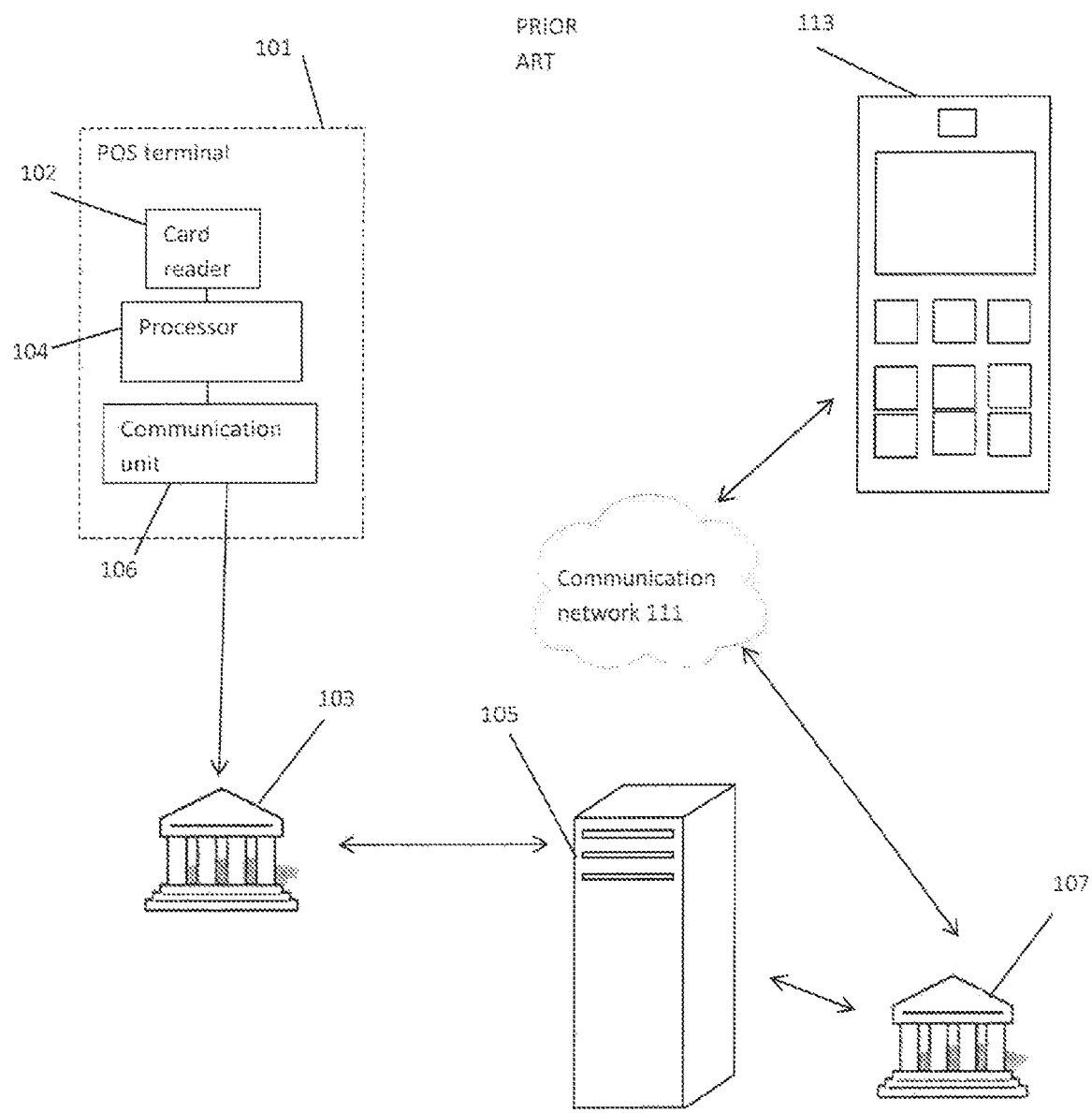
FIG. 1 shows a known payment network, in accordance with a prior art.

As in the known system of FIG. 1, the computerized network of FIG. 3 includes a POS terminal 301 which comprises a card reader 302, a processor 304 and a communication unit 306, for communication with an acquirer bank server 303. Additionally, the POS terminal 301 is provided with a camera 308. Alternatively or additionally, the POS terminal 301 is in communication with an external camera at the retail premises. For example, the retail premises may include a close-circuit television (CCTV) system having at least one CCTV camera 310, and the POS terminal may be operative to obtain images from the CCTV camera(s) 310. The cameras 308, 310 may be operative to collect images periodically, e.g. with a period of a few seconds, or with a longer period. The camera(s) 308 and/or the camera(s) 310 may also be operative to capture video clips, e.g. with a shutter rate sufficiently high that movements of individuals such as the user appear smooth. Optionally, the processor 304 may be operative to control the cameras 308 and/or 310, such as to control the timing with which the cameras 308 and/or 310 capture images. For example, the processor 304 may be operative to send a command to the cameras 308 and/or 310 to control the cameras 308 and/or 310 to perform a series of pre-defined steps to capture one or more images, e.g. to capture a sequence of images at pre-defined intervals, to perform a pre-defined pan operation and/or to perform a predefined zoom operation.

Figure 4A:
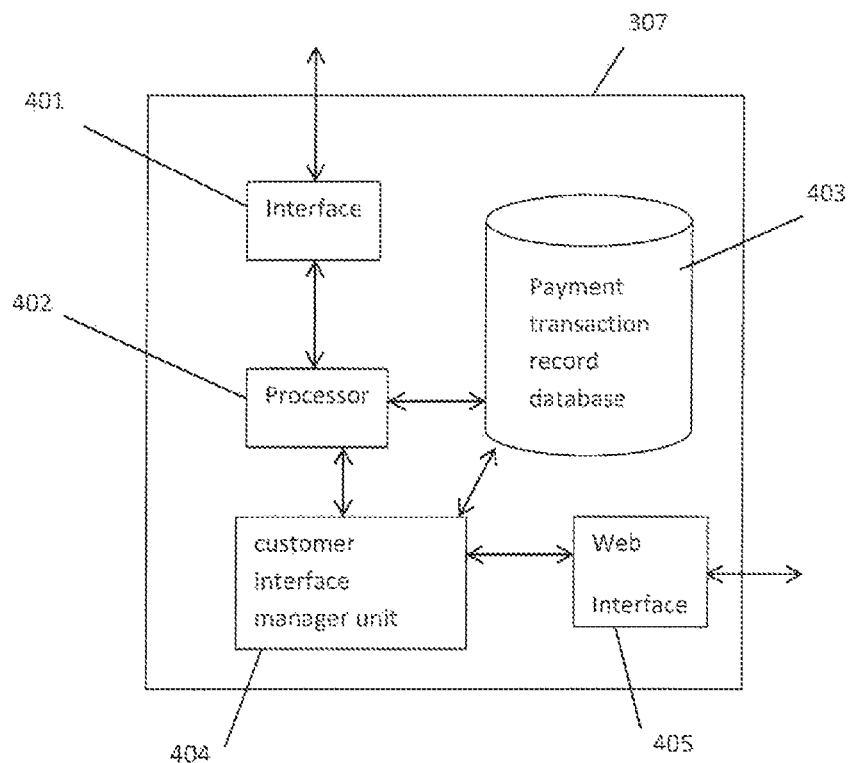
FIG. 4 is composed of FIG. 4(*a*) which shows an issuer bank server of the payment network of FIG. 3, and FIG. 4(*b*) which shows the structure of a database of the issuer bank server.

FIG. 4(a) shows the structure of the issuer bank server 307. The issuer bank server 307 comprises an interface module 401 for communicating with the payment network server 305, a processor 402, and a payment transaction record database 403 for storing payment transaction records. Optionally, it may further contain a customer interface manager unit 404 for extracting data from the payment transaction record database 403, and a web interface module 405 for establishing communication between the customer interface manager unit 404 and the communication network 311 of FIG. 3.

Figure 4B:
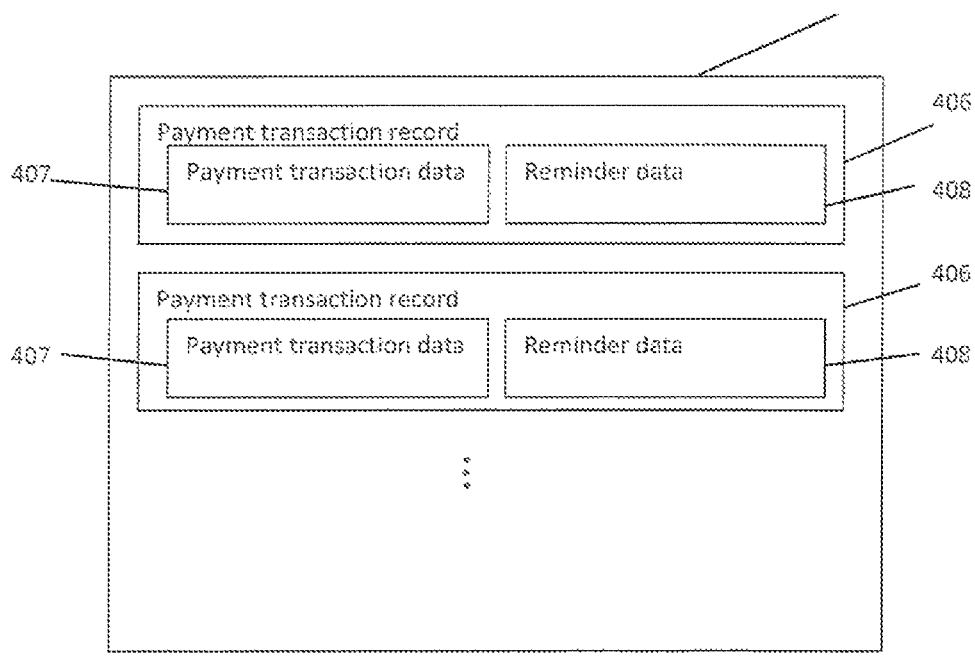

FIG. 4(b) shows schematically the structure of each of a plurality of payment transaction records 406 in the database 403. Each record includes payment transaction data 407 of the same type generated in the first and second known payment networks of FIGS. 1 and 2, and reminder data 408 as described below.

Figure 5:
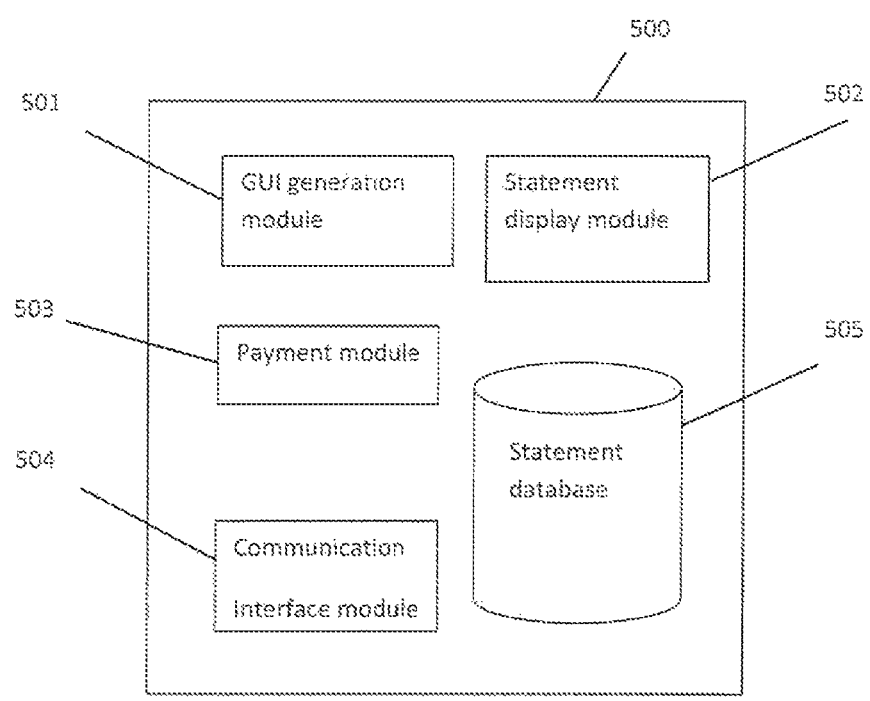
FIG. 5 shows schematically the structure of an application which runs on a user communication device of the payment network of FIG. 3.

FIG. 5 shows schematically the structure of an application 500 which runs on the user communication device 313 of FIG. 1. The application includes a GUI generation module 501 for generating a user interface on a screen of the communication device 313.

Additionally, the application 500 includes a statement display module 502. The statement display module is operative to communicate at intervals via a communication interface module 505 with the issuer bank server 307. In particular a communication path is established from the statement display module 502, via the communication interface module 504 and the web interface 405 of the issuer bank server 307, to the customer interface manager unit 404 of the issuer bank server 307. As described in more detail below, this allows the statement display module 502 to interact with the customer interface manager unit 404 to obtain statement data relating to the user from the payment transaction record database 403. The statement display module 502 stores this data in the statement database 505. The statement display module 502 is operative to interact with the GUI generation module 501 to display data from the statement database 505 to the user under the user's control.

Optionally, the application 500 further includes a payment module 503 which is operative to control payments may using the user's payment account using the user's payment card (the application 500 may store details of this account). For example, the payment module 503 may be operative to communicate with the POS terminal 301 of FIG. 3 by communicating with it using the communication interface module 504, and transmitting to it data identifying the user's payment card. The communication may be via the communication network 311, or using a separate wireless communication protocol such as a wifi or Bluetooth connection; for this purpose the POS terminal 1 may have a suitable communication interface which is not illustrated in FIG. 3. The user can control this process using the GUI generated by the GUI generation module 501. Note however that in other embodiments the application 500 may omit the payment module 503. In this case, the user may use the payment card to make a payment without the communication device 313 being involved in the process.

Note that the application 500 is optional to the embodiment, since in a variation the user communication device 313 may run a browser which is able to communicate with the communication interface module 404 of the issuer bank server 307 via the web interface 405. In this case, the communication interface module 404 may interact with the browser to display information from the payment transaction record database 403 to the user.

Figure 6:
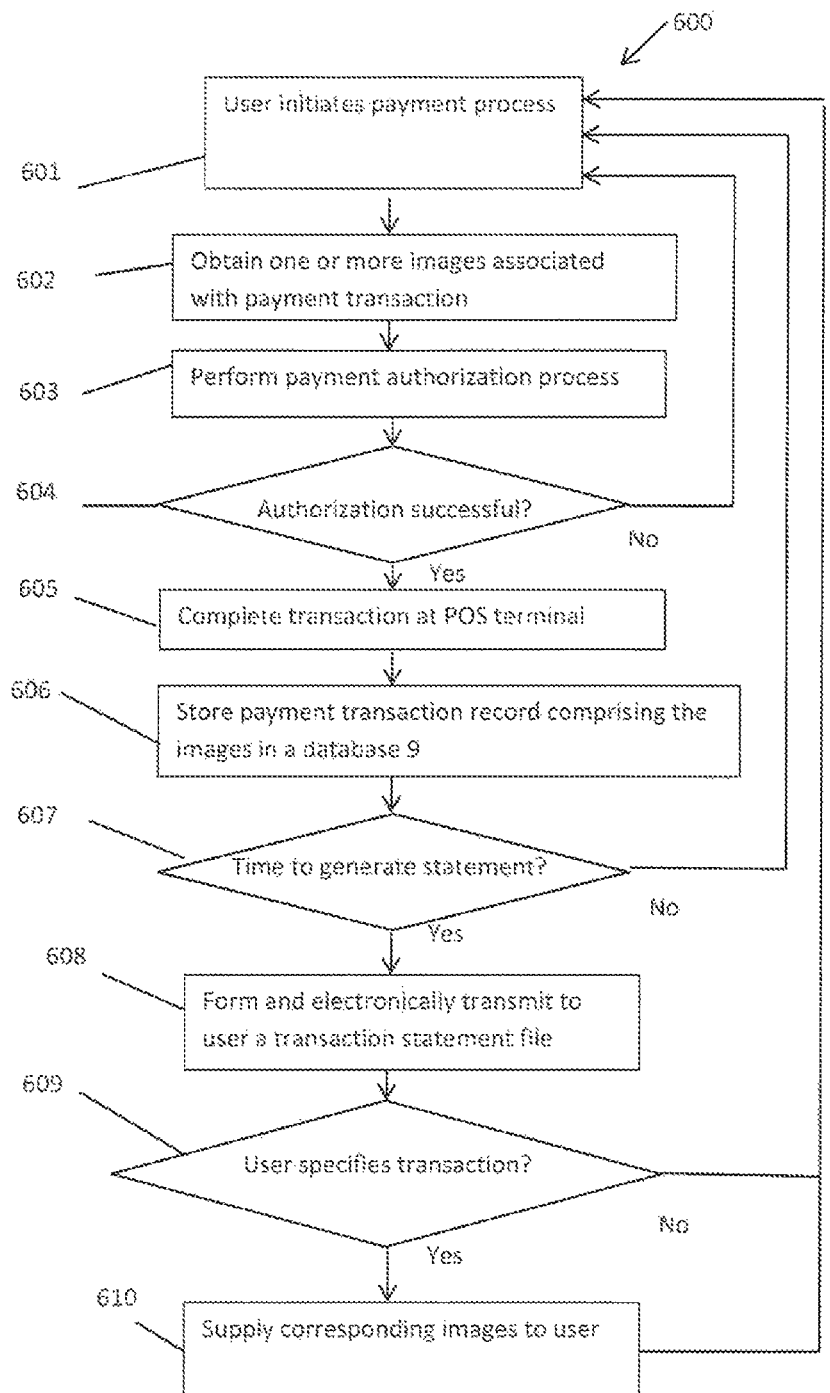
FIG. 6 shows the steps of a method in accordance with an embodiment of present disclosure and which may be performed by the computerized network of FIG. 3.
Figure 10:
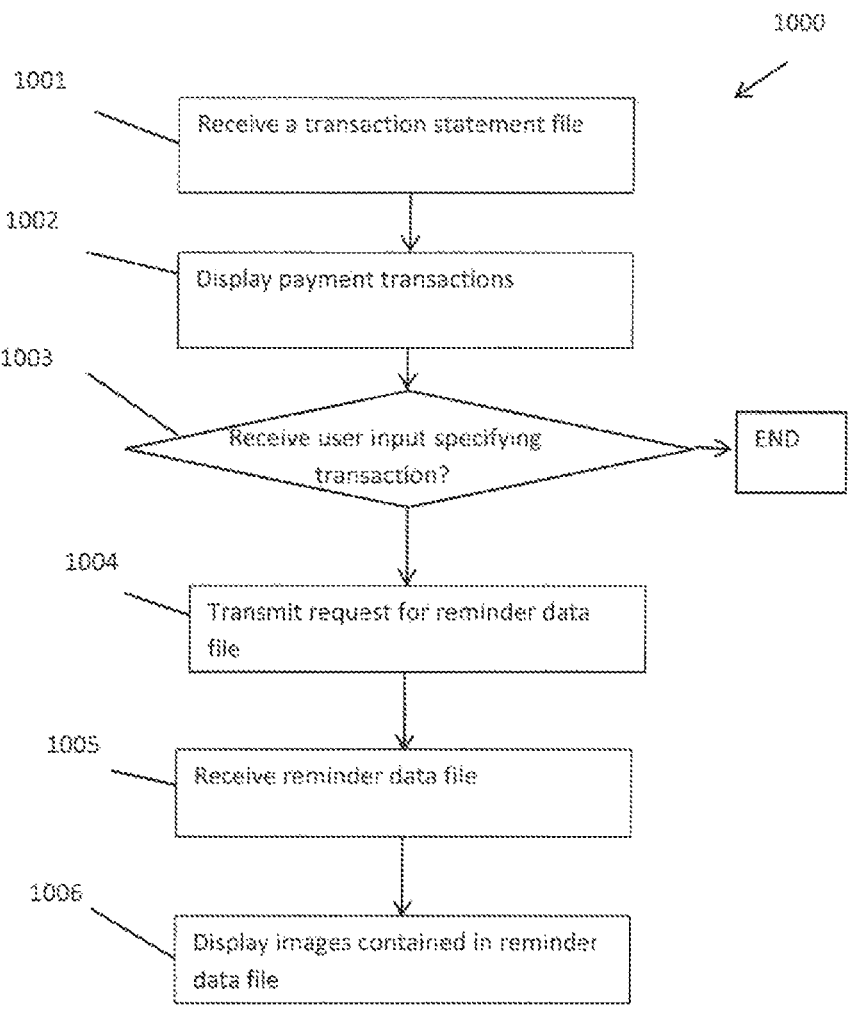
FIG. 10 shows the steps performed by a user communication device for displaying data relating to payment transactions.

The method 600 carried out by the computerized network of FIG. 3 as a whole is illustrated in FIG. 6. The part of this process carried out by the POS terminal 301 is method 600 illustrated in FIG. 6. The part of the process of FIG. 4 carried out by the issuer bank server 307 is method 700 illustrated in FIG. 7. The part of the process carried out by the application 500 is illustrated in FIG. 10.

Referring firstly to FIG. 5, in step 201 of method 600 the user initiates a payment transaction by supplying a payment card to the card reader 302. The card reader 302 receives the payment card details.

In step 602, the POS terminal 1 obtains one or more images associated with the payment transaction. The POS terminal 301 may do this by controlling the camera 308 to capture the image(s). If the camera 308 is a video camera, then the images captured with the camera 308 may be at least one video clip. Alternatively or additionally, the POS terminal 301 may transmit a signal to the CCTV system, to instruct the CCTV system to supply the one or more images. For example, if the camera 310 is not currently active, the camera 310 may be activated by the POS terminal to capture the images. Alternatively, if the camera 310 is continually capturing images (at short intervals) so as to obtain video footage (e.g. stored within the CCTV system), the POS terminal 301 may obtain a clip of the video footage captured by the camera 310.

In a further possibility, the POS terminal 301 may obtain from some or all of the image(s) from an imaging device 316 (a webcam or camera) of the user communication device 313. For example, as noted above, the payment module 503 may be operative to communicate with the POS terminal 301 In this case, the POS terminal 301 may instruct the application 500 to control the imaging device 316 (optionally also with user input) to capture at least one image and transmit it to the POS terminal. The image(s) may include an image of the user, and/or an image of the merchant premises, and/or an image of the product.

In step 603, the computerized network attempts to perform the payment authorization process described above. Step 603 comprises the following steps: the POS terminal 1 initiates the payment authorization process by transmitting a payment authorization request to the acquirer bank server 303, and including transaction details including the payment card details, the payment amount, a time stamp and/or the name of the merchant. Additionally, unlike the conventional system described above, in the embodiment the payment authorization request includes the images captured in step 602.

The acquirer bank server 303 forwards the payment authorization request (including the images) to the payment network server 305; the payment network server 305 forwards the payment authorization request (including the images) to the issuer bank server 307; the issuer bank server 307 performs an authorization procedure; and the issuer bank server 307 transmits the result to the payment network server 305, which forwards it to the acquirer bank server 303, which forwards it to the POS terminal 301.

In step 604 it is determined if the result of the authorization procedure is successful. Step 604 includes the issuer bank server 307 determining whether the authorization procedure was successful. If so, it debits the payment amount (optionally plus a handling charge) from the bank account of the user. Conversely, if the issuer bank server 307 determines that the authorization procedure was unsuccessful, the issuer bank server returns to a state of waiting to receive a payment authorization request.

Step 604 further includes the acquirer bank server 303 determining whether the authorization procedure was successful, and if so crediting the payment amount (optionally less a handling charge) to the bank account of the merchant. Note that at some later time (e.g. during clearing and settlement operations), the issuer bank transfers a corresponding amount of money (e.g. the payment amount) to the acquirer bank.

Step 604 further includes the POS terminal 301 determining whether the authorization request was successful. If the result of the authorization request was negative, the POS terminal 301 returns to a state of waiting for a user to initiate a payment transaction.

Alternatively, if the result of the authorization request was positive, then in step 605 the POS terminal 301 informs the user, and the purchase is completed. The POS terminal 301 returns to a state of waiting for a user to initiate a payment transaction.

In step 606, the issuer bank server 307 creates a payment transaction record 404 in the database 403 comprising the payment transaction data and the images. The payment transaction is linked with the images using a store ID number ("store ID") and the time and data of the transaction. In a variation of the embodiment, respective portions of the payment transaction record may be stored in different databases, e.g. with the payment transaction data stored in a first database and the reminder data in a second, with the two being linked or associated, such as by an index number.

In step 607, the issuer bank server 307 determines whether it is time to generate a transaction statement to the user. In principle, the issuer bank server 307 may do this whenever a payment transaction is successfully processed. In another possibility, the issuer bank server 307 does this periodically, e.g. once a month. If it is determined in step 607 of the method 600 that it is not yet time to generate a transaction statement, the method 600 returns to step 601.

Conversely, if the determination in step 607 of the method 600 is positive, then in step 608 of the method 600, the issuer bank server 307 forms a transaction statement in the form of a transaction statement file (an electronic data file).

The transaction statement file is transmitted over the communication network 311 to the communication device 313 associated with the user. The transmission of the transaction statement file to the communication device 313 may be done in several ways. For example, the file may be transmitted by email to the user's email address, and the communication device 313 may be configured to download emails from a mail server (not shown in FIG. 3). Alternatively, as mentioned above, the communication device 313 may be provided with a browser application which is operative to communicate with a web-interface generated by the issuer bank server 307, and download the transaction statement file from it. Alternatively, the communication device 313 may be provided with the software application 500 which is operative to communicate over the communication network 311 with the customer interface manager unit 404 of the issuer bank server 307 and obtain the transaction statement file.

The format of the transaction statement file is best appreciated from FIG. 7, which is composed of FIGS. 7(*a*) and 7(*b*). FIG. 7(*a*) shows how the transaction statement file appears when it is displayed on a screen of the communications device 313. It includes an area 701 which is a list of the transactions which the payment card has been used for during a certain period. For each of the transactions, there is a date (obtained from the time-stamp in the authorization request) and a merchant name (obtained from the merchant name in the authorization request). In the example of FIG. 7(*a*), there were three transactions between Dec. 1, 2016 and Dec. 17, 2016.

In the embodiment, unlike in a conventional system, each of the three transactions is displayed to the user in register with a respective clickable area 702, 703, 704 of the display screen. In FIG. 7(*a*) these labels are indicated "no", indicating that the user should click on them if the user does not recognize the corresponding payment.

Each of the clickable areas 702, 703, 704 is associated in the transaction statement file with respective linking data in the transaction statement file. The linking data comprises an address of a record for the corresponding transaction in the database 403. If the user clicks on one of the clickable areas (for example, the area 704), the browser or application 500 on the communication device 313 uses the linking data to contact the customer interface manager unit 404 of the issuer bank server 307 over the communication network 311, and transmit to it at least a portion of the linking data identifying the corresponding payment transaction.

The issuer bank server 7 determines in step 609 of method 600 whether it has received this user input specifying one of the payment transactions. If there is no such user input the method returns to step 201.

Alternatively, if the determination is positive, in step 610 of method 600 the customer interface manager unit 404 of the issuer bank server 307 obtains reminder items comprising the respective image(s) for the payment transaction from the database 403. The issuer bank server 307 transmits the reminder items over the communication network 311 to the communication device 313. The communication device 313 displays the image(s) to the user.

This is illustrated as FIG. 7(b), in the case that that user clicked on the area 704 in FIG. 5(a). A photograph 505 of the user's face captured by the camera 308 or camera 310 (or an image captured by the camera 316) is displayed in the screen of the communications device 313.

By recognizing his or her face the user is able to verify that it was indeed him or her who made the transaction. This may prompt the user to remember the transaction, and accordingly reduce the risk that the user instigates an erroneous transaction query. Thus, the linked image(s) in the database 403 function as a reminder data file for the corresponding payment transaction.

In addition to, or instead of, the images including an image of the user, the images may further comprise at least one image of the product(s) which the user purchased. The likelihood that the user recognizes a transaction he or she has made is higher if the number of images is higher. Thus, it is preferable if the reminder data file for the transaction comprises a video clip, and preferably clips, taken by the camera(s) 308 and/or by one or more CCTV camera(s) 310 and/or by the camera 316. A user who knows at the time that the purchase is made that the images are being captured may get into the habit of hold the purchases in a position where they will be imaged by the camera 308 and/or the CCTV camera(s) 310 and/or the camera 316.

If, however, the reason that the user did not recognize the transaction was that it had been made by an individual (for example, a family member) who had borrowed the payment card, the user would be able to identify the family member from the image 705. The user may then challenge the individual as appropriate and/or verify with the individual that the transaction details are correct.

Figure 8:
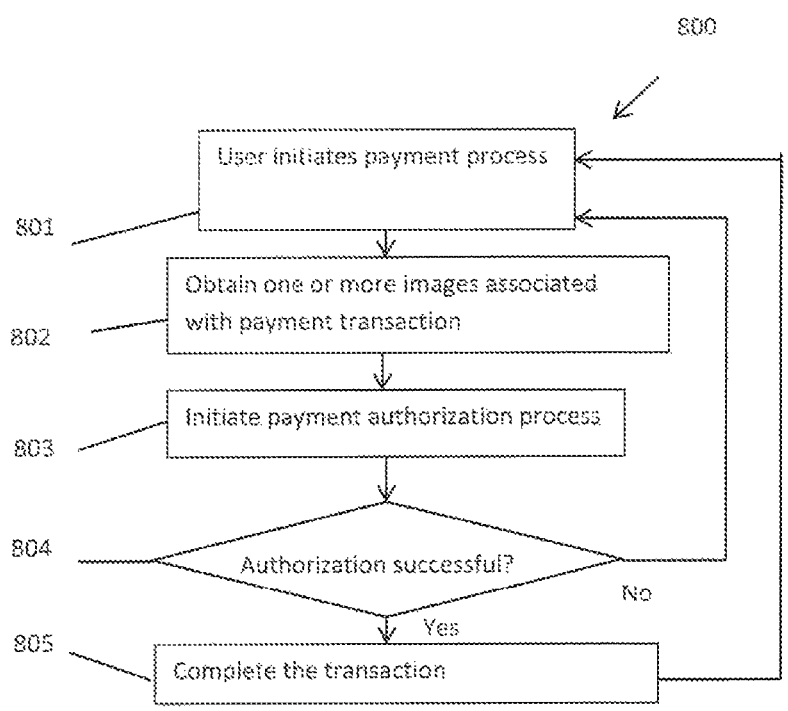
FIG. 8 shows the steps of the method of FIG. 6 which are performed by a POS terminal of the payment network of FIG. 3.

We now turn to explanation, with reference to FIG. 8, of the method 800 performed by the POS terminal 301 to implement its part of the method 600 of FIG. 6. In step 801, the user initiates the payment process. In step 802, the POS terminal 301, obtains the one or more images associated with the payment transaction from the cameras 308, 310 and/or 316. In step 803, the POS terminal initiates the payment authorization process by transmitting the payment authorization request which includes the image(s) to the acquirer bank server 303, which forwards the payment authorization request via the payment network server 305 to the issuer bank server 307. In step 804, the POS terminal receives from the acquirer bank server 303 the message of whether the authorization is successful. If not, the method returns to step 801. If so, the POS terminal 301 completes the transaction in step 805, by notifying the user (and any shop assistant in attendance) that the payment has been successful.

We now turn to an explanation of the method 900 carried out by the issuer bank server 7 to implement its part of the method 600 of FIG. 6. In step 901 the processor 402 of the issuer bank server receives the payment authorization request via the interface 401, and caches it. In step 902, the issuer bank server 307 performs an authorization process. In step 903, if the result is negative, the method returns to step 901. In step 903, if the result is positive, the method passes to step 904. In step 904, the processor 402 debits the account of the user. In step 905, the processor 402 stores the payment transaction record 406 in the database 403. In step 906, the processor 402 determines if it is time to generate a statement. If not, the method returns to step 901. If so, then, in step 907, the processor 402 controls the customer interface manager unit 404 to form and electronically transmit to the user a transaction statement file, based on the payment transaction data 407 in the payment transaction records 406 for the user. In step 908, the customer interface manager unit 404 determines if it receives a message from the communication device 313 indicating the user has provided data input specifying one of the transactions. If so, in step 909 it supplies the reminder data 808 from the corresponding payment transaction record 407 to the communication device 313.

We now turn to an explanation of the method 1000 carried out by the statement display module 502 of application 500 (or, if no application 500 is used, by the browser running on the communication device 313). In step 1001 the statement display module 502 receives the transaction statement file and stores it in the statement database 505. In step 1002 it displays the transactions on the screen of the communication device 313 (e.g. in the format of FIG. 7(a)). In step 1003 it is determined if there is user input specifying one of the transactions. If not, the method ends. If so, in step 1004, the statement display module 502 sends a message to the customer interface manager unit 404 of the issuer bank server 307 requesting the reminder data file. This request is generated using the linking data of the specified transaction. In step 1005 it receives the reminder data file. In step 1006, the statement display module 502 displays the images contained in the reminder data file on the screen of the communication device.

Many variations of the embodiment are possible within the scope of the present disclosure. For example, whereas in the explanation above it is indicated that the step 602 of method 500 of obtaining the images is performed after step 601, in fact the images may be captured prior to step 601 (e.g. while the user is moving around retail premises selecting the products). Thus, step 602 may in fact consist of obtaining from the CCTV system images which were captured prior to step 601, and associating them with the payment transaction.

Figure 2:
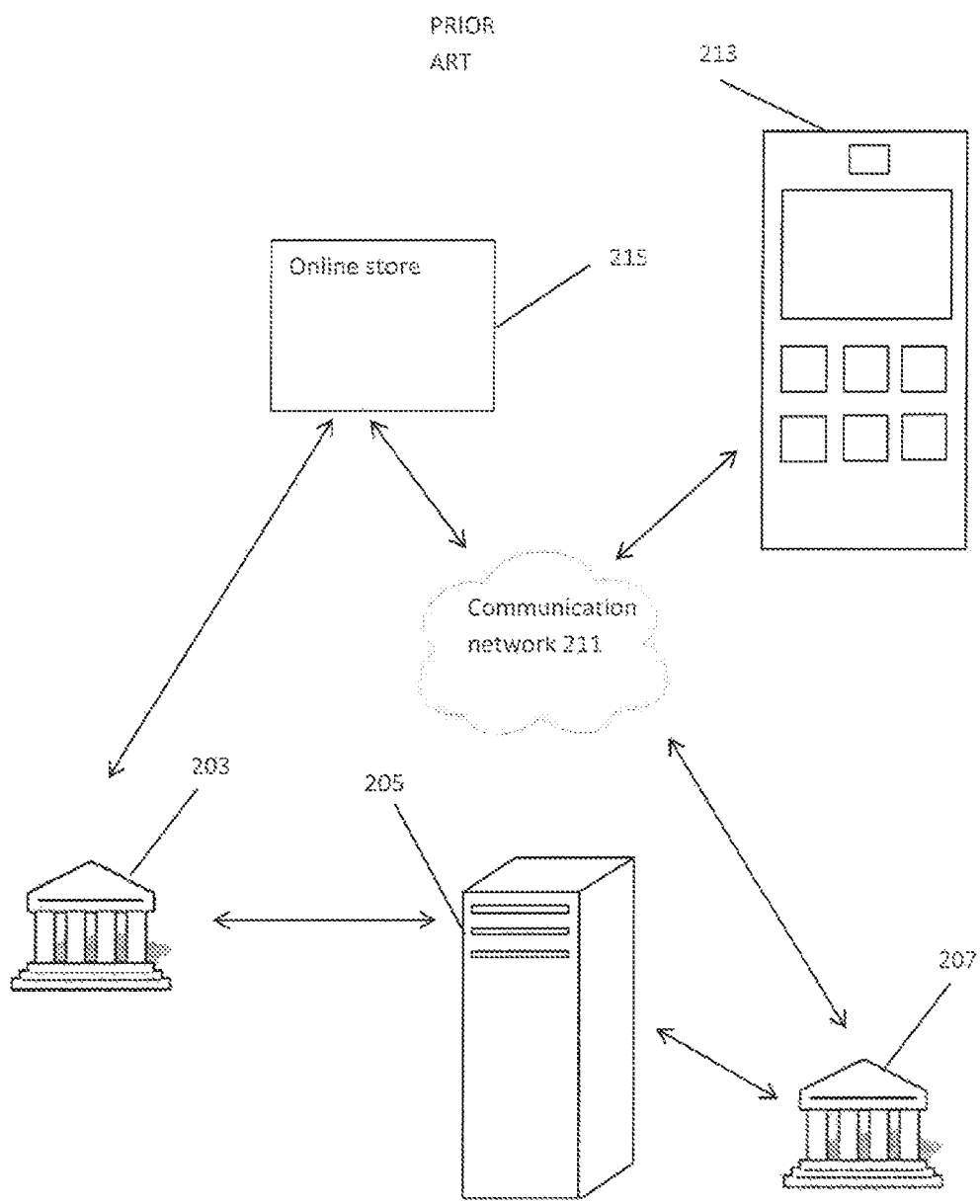
FIG. 2 shows a second known payment network.

Furthermore, although FIG. 2 is presented as a single flow, in variants the computerized network runs several process flows in parallel with each other. There would typically be one process flow for each payment transaction (steps 601 to 606 of FIG. 6), and an independent process flow relating to steps 608 to 610. Thus, steps 608 would performed with a timing which is independent of the timing of the set of steps 601 to 606.

Figure 11:
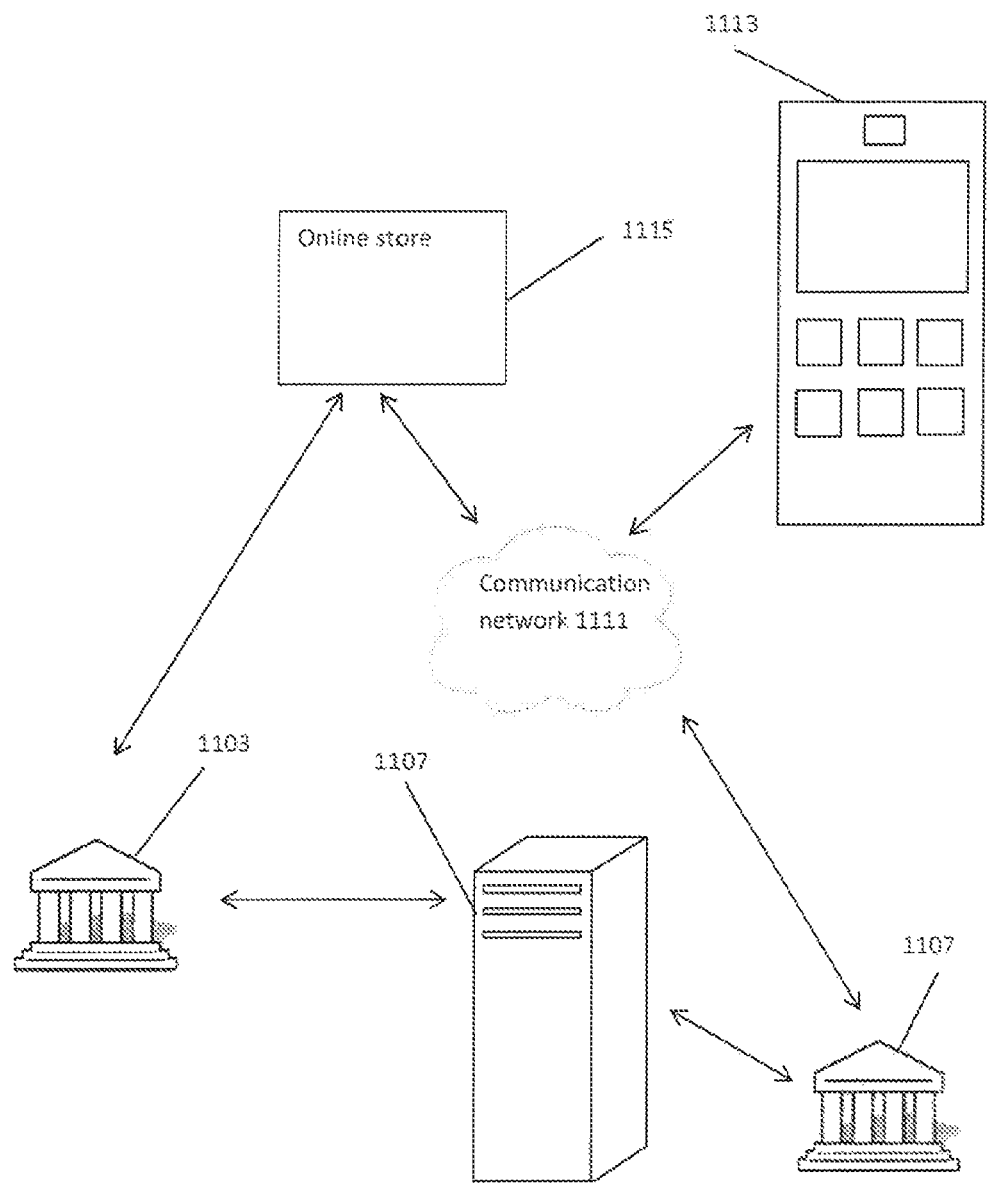
FIG. 11 shows a payment network which is in accordance with a second embodiment of present disclosure.

FIG. 11 shows a second computerized network which is a second embodiment of the present disclosure. In this embodiment elements having the same meaning as in FIG. 2 are given the reference numbers 900 higher. The second embodiment differs from the first embodiment only in that the POS terminal 301 is replaced by a server 1115 which operates an online store.

Figure 12:
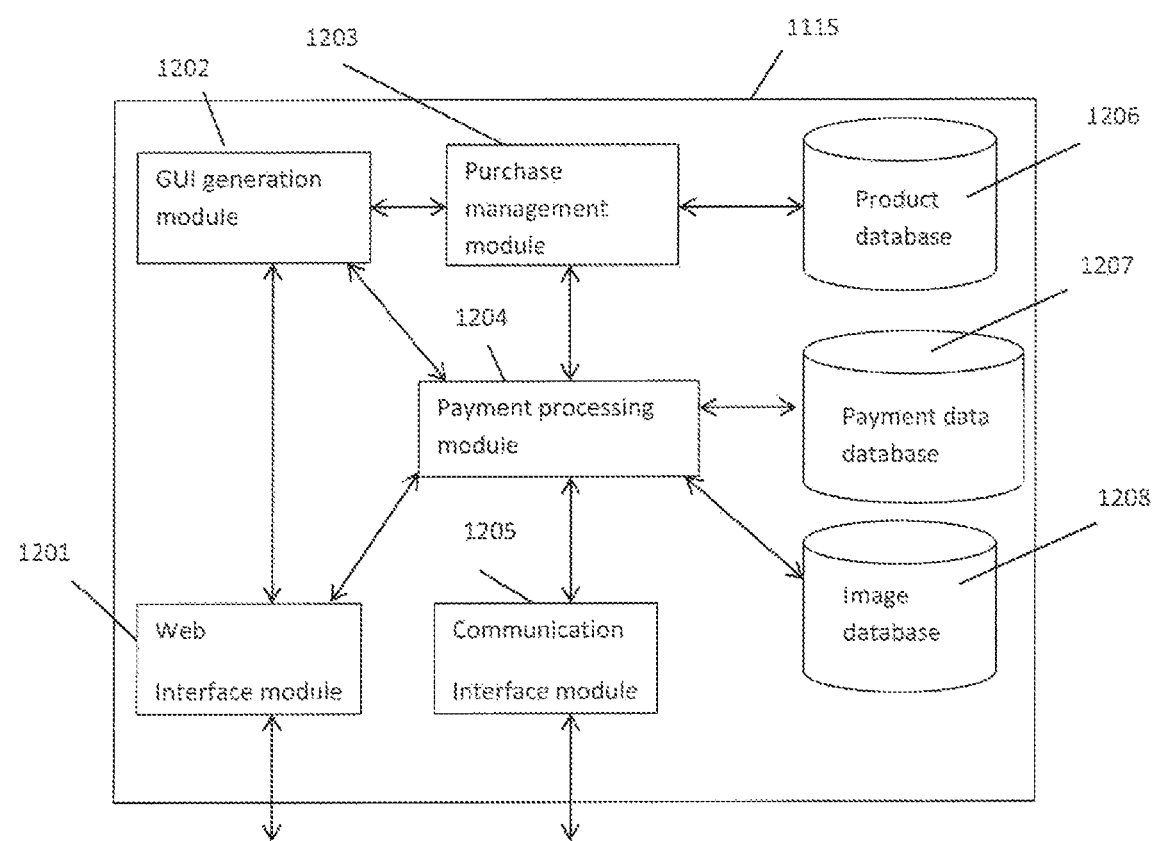
FIG. 12 shows schematically the structure of a merchant server of the payment network of FIG. 11.

The structure of the online store server 1115 is shown in FIG. 12. It includes a web interface module 1201 for communicating with the communication network 1111. It further includes a purchase management module 1203 and a product database 1206 storing information about products offered by the store. A payment processing module 1204 is provided with access to a payment data database 1207 and an image database 1208 and a communication interface module 1205 for communication with the acquirer bank server 1103.

The user uses his or her communication device 1113 to interact with the online store server 1115 via the communication network 1111. The GUI generation module 1202 online store server 1115 is able to control a GUI displayed on a screen of the communication device 1113, which may be generated by a browser interacting with a web-interface of the online store server 15, or may be generated by an application running on the communication device 1113.

Figure 9:
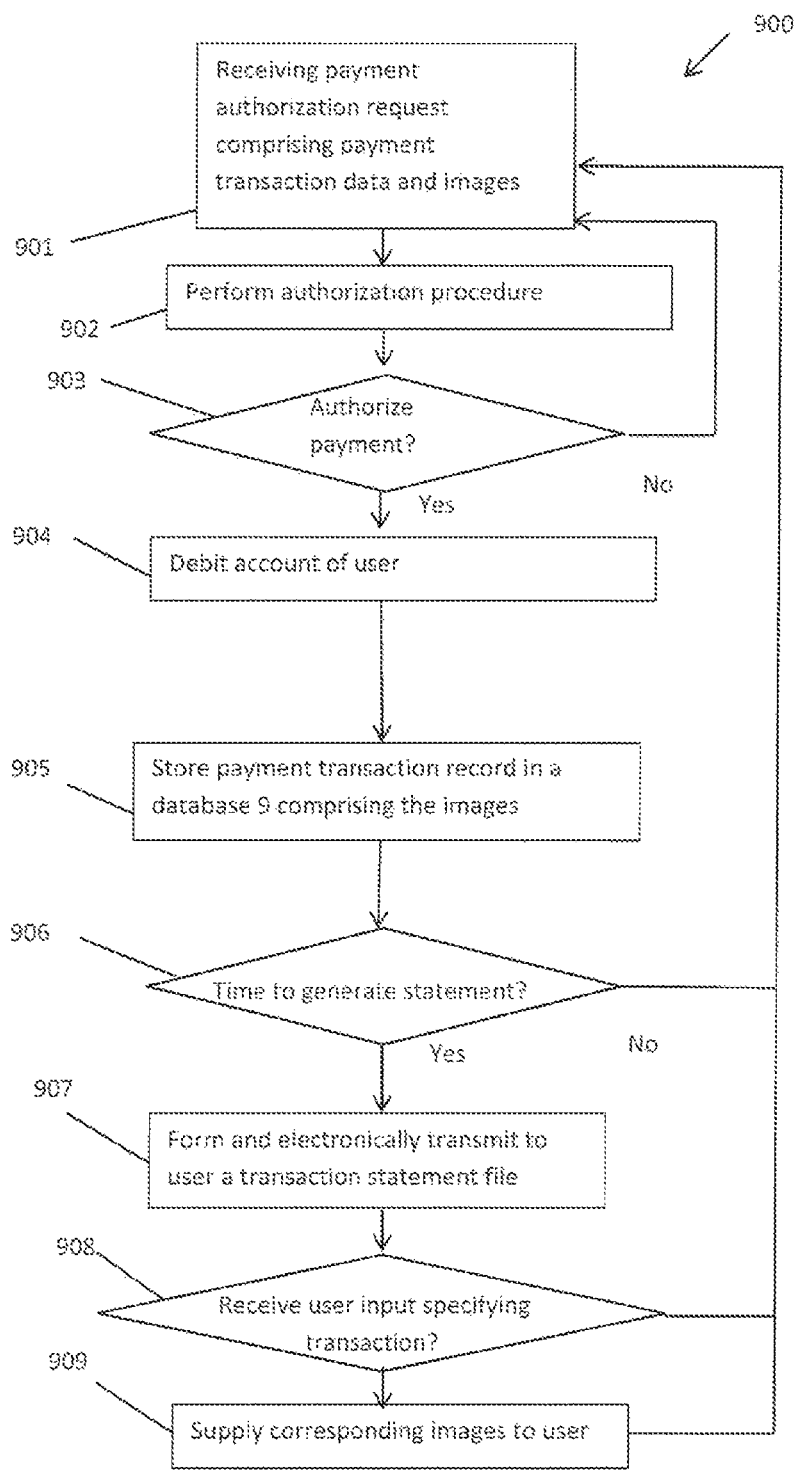
FIG. 9 shows the steps of the method of FIG. 6 which are performed by a merchant computer apparatus.

The purchase management module 1203 manages a product selection process in which data about products stored in a product database 1206 is presented to the user, to allow the user to make a selection. Subsequently, the method performed by the computerized network of FIG. 12 is the same method 600 explained above. That is, the online store server 1115 is operative to perform the method 800 of FIG. 8 in place of the POS terminal 301. The issuer bank server 1107 performs the method 900 of FIG. 9 as in the case of the computerized network of FIG. 3.

In the case of the computerized network of FIG. 11, the step 601 of the method 600 is typically performed by the user entering a command to initiate a check-out procedure. At this stage the payment processing module 1204 of the online store server 1115 may obtain data identifying the payment card from the user (i.e. the user enters details of a payment card). Alternatively, if the user has previously established a user account and provided payment card details, the payment processing module 1204 may, following an operation of the user identity being verified, obtain the data identifying the payment card data from a database accessible to the online store server 1115, and indexed using the user account.

In a further possibility, the online store server 1115 may obtain the payment card data from a "digital wallet" (such as MasterPass® operated by MasterCard® Inc.), where the payment card was previously registered. In this case, the online store server 1115 may establish communication between the user and a server providing the digital wallet (which may be either the payment network server 1105 or the issuer bank server 1107). Once the user has identified him or herself to the server providing the digital wallet, and has optionally selected one of multiple payment cards which the user has previously registered with the digital wallet, the server providing the digital wallet transfers details of the payment card to the online store server 1115.

Furthermore, in the case of the computerized network of FIG. 11, the step 602 of method 600, of obtaining image(s) associated with the payment transaction is performed differently. There are several possibilities for how this is done.

In one possibility, the images obtained in step 602 may comprise images of a product which the user purchases in the transaction.

Alternatively or additionally, the payment processing module of the online store server 1115 may be operative to instruct the communication device 1113 (via the web interface module 1201) to capture an image of the user using a camera of the communication device 1113 (e.g. a web camera if the communication device 1113 is a laptop, or a front camera if the communication device 1113 is a mobile phone), and transmit it to the online store server 1115.

Alternatively or additionally, the step 602 may be implemented in the case of the computerized network of FIG. 11 by obtaining images of an interface presented to the user during the shopping process. For example, at least one image may show a shopping basket of the user at a time when the user initiates the check-out operation.

It was noted above, in the case of computerized network of FIG. 3, that the images obtained in step 602 might be ones which were actually captured before the payment process was initiated (e.g. by CCTV camera(s) as the user moved around a retail location). In a similar way, as a user interacts with the purchase management module 1203 of the online store server 1115 prior to initiating the check-out procedure, the online store server 1115 may periodically store information about the shopping process in a cache (e.g. a screen-shots of an image seen by the user during the shopping procedure). If so, step 602 might include extracting these image(s) from the cache. The images might include any one or more of: a login page for the merchant, the items in the basket at one or more times, the confirmation of payment page, a bill receipt. Optionally, each screen-shot could be associated with a time-stamp when it was captured, and this data (initially stored in the cache) could be obtained from the cache as part of step 602, and incorporated in the reminder data file.

The online store server 1115 may thus generate a "video" (not necessarily one showing smooth movements) incorporating these image(s), and optionally one or more images captured by a camera of the communication device 1113. The video might also incorporate a display of any of the time stamps. The video is transmitted to the issuer bank server 1107 in step 603 of method 600, as part of the payment authorization request.

In both the computerized-networks of FIGS. 3 and 11, the reminder data file stored in the database 403 is preferably maintained there for a predetermined time (such as at least one week, and more typically about 60 days) and then removed. In this way, the required capacity of the database 403 is reduced.

Many variations of the computerized networks of FIGS. 3 and 11 are possible within the scope of the invention, as will be clear to a skilled reader. For example, in a typical embodiment the acquirer bank server 303/1103, payment network server 305/1105 and issuer bank server 307/1107 are configured to service payment transactions made by multiple merchants. Some of these payment transactions will be payment transactions to POS terminals such as the POS terminal 301 of FIG. 3; other payment transaction will be payment transactions to online store servers such as the online store server 1115.

Furthermore, although in the description above the image(s) captured in step 602 may be included in the payment authorization request sent in step 603 by the POS terminal 301 or online store server 1115 to the issuer bank server 307/1107 via the acquirer bank server 303/1103 and payment network server 305/1105, alternatively at least some of the images may optionally be sent from the POS terminal 301 or online store server 1115 to the payment network server 305/1105, and/or from the payment network server 305/1105 to the issuer bank server 307/1107, in a separate transmission at a different time, e.g. in step 604 in response to a determination that the authorization in step 603 is successfully completed.

In another variation, two separate connections may be initiated if parallel processing is allowed. One may be used for sending images and another for the messages of the payment authorization process.

In a further variation, the images captured at step 602 of method 600 may be subject to a compression algorithm before they are stored in the payment transaction record database 403, to reduce the volume of data which is stored in the database 403. In the embodiment of FIG. 3, the compression algorithm may, for example, be carried out any of the processor 304 of the POS terminal 301, the acquirer bank server 303, the payment network server 305, of the processor 402 of the issuer bank server 403. In the embodiment of FIG. 3, the compression algorithm may, for example, be carried out any of the processor 304 of the POS terminal 301, the acquirer bank server 303, the payment network server 305, of the processor 402 of the issuer bank server 403.

Alternatively or additionally, a selection may be made of which images to store in the payment transaction record database 403. For example, one or more of the images may be identified (for example by the POS terminal 301 as part of step 602) as "key image", such as images captured when the card holder is making the payment. The issuer bank server 307 may prioritize the key image(s) and store these, but not the other image(s), if the storage space is limited. Conversely, if the storage space is not subject to restrictions, the images stored may, for example, be a short (e.g. under one minute, or under 30 seconds) video of the user making the payment associated with the transaction.

Furthermore, optionally, in step 610, the issuer bank server 307/1107 may not transmit all the reminder images to the communication device 313/1113 to save bandwidth. Rather, the issuer bank server 307/1107 may submit only a subset (e.g. one) image at a time, and only transmit further images if the user provides further data input to request further ones of the images. The images of the reminder data may optionally be stored with priority information defining a priority in the images, such that at least one highest priority image is forwarded in response to the first request, then lower priority image(s) are transmitted in response to further request(s).

Furthermore, other elements of the system may have access to the reminder data in the database 403. For example, a merchant computer, such as the online store server 1115, may be able to access the reminder data. This would allow the merchant to use the reminder images in a security operation, e.g. if there is a suspicion that a customer has illicitly removed more items than he or she has paid for.

Furthermore, although in the explanation above, it was the issuer bank server 307/1107 which populates the database 403, and answers request(s) for reminder data files generated by the communication device 1113 using the linking data, in variations of the embodiments a different server may perform this role. For example, for at least some transactions, the database 403 where the reminder data files are stored (and to which the merchant computer apparatus (POS terminal 301 or online store server 1115) transmits the image(s)) may be provided in the acquirer bank server 303/1103, or even in the POS terminal 301 and/or the online store server 1115. In any of these cases, the linking data included in the transaction statement file would typically include an address of the corresponding record in the corresponding database.

Furthermore, it is possible for the transaction statement file to include the reminder data file associated with each of the corresponding transactions. If so, the linking data for a given transaction may include an address within the transaction statement file. Thus, the linking data enables the communication device 13 to obtain the reminder data file (e.g. the images(s)) associated with the transaction from the corresponding addressed portion of the transaction statement file. In another variation, the reminder data files for the transactions listed on the statement may be downloaded to the communication device in a second file separate from the transaction statement file, and the linking data for a given in the transaction statement file may specify addresses of the reminder data files in the second file. In either of these cases, the request transmitted by the statement display module 502 in step 1004 may be to the statement database 505, and in step 1005 the statement display module may receive the reminder data file from the statement database 505. However, both these variations have the disadvantage that the data downloaded to the communication devices would include image(s) for all the transactions, and therefore significantly increase the total data which has to be downloaded to and stored within the statement database 505 of the communication device 13.

Figure 13:
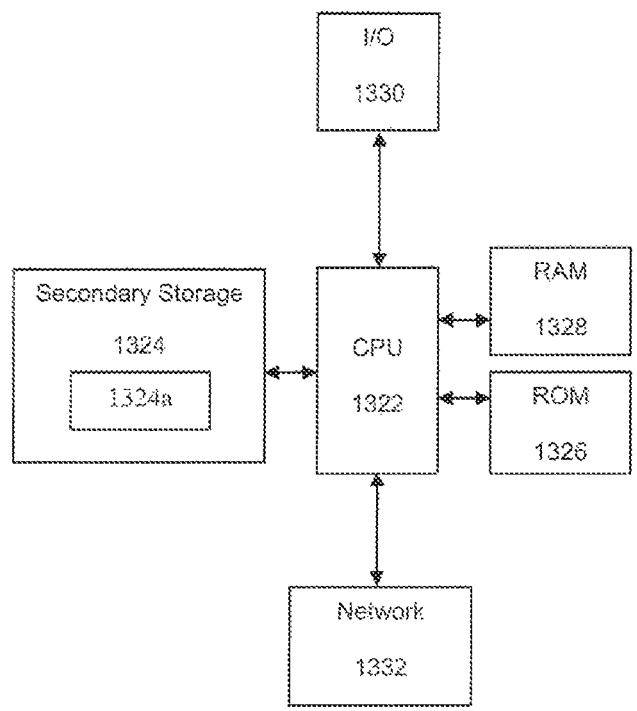
FIG. 13 shows schematically the structure of a server which may be used in the payment networks of FIGS. 3 and 6 to implement a method which is in accordance with an embodiment of present disclosure.

FIG. 13 is a block diagram showing a technical architecture of the issuer bank server 307/1107 and/or the online store server 1115. The acquirer bank server 303/1103 or the payment network server 305/1105 may also have this technical architecture.

The technical architecture includes a processor 1322 (which may be referred to as a central processor unit or CPU) that is in communication with memory devices including secondary storage 1324 (such as disk drives), read only memory (ROM) 1326, random access memory (RAM) 1328. The processor 1322 may be implemented as one or more CPU chips. The technical architecture may further comprise input/output (I/O) devices 1330, and network connectivity devices 1332.

The secondary storage 1324 is typically comprised of one or more disk drives or tape drives and is used for non-volatile storage of data and as an over-flow data storage device if RAM 1328 is not large enough to hold all working data. Secondary storage 1324 may be used to store programs which are loaded into RAM 1328 when such programs are selected for execution.

In this embodiment, the secondary storage 1324 has a processing component 1324a comprising non-transitory instructions operative by the processor 1322 to perform various operations of the method of the present disclosure. The ROM 1326 is used to store instructions and perhaps data which are read during program execution. The secondary storage 1324, the RAM 1328, and/or the ROM 1326 may be referred to in some contexts as computer readable storage media and/or non-transitory computer readable media.

I/O devices 1330 may include printers, video monitors, liquid crystal displays (LCDs), plasma displays, touch screen displays, keyboards, keypads, switches, dials, mice, track balls, voice recognizers, card readers, paper tape readers, or other well-known input devices.

The network connectivity devices 1332 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 1332 may enable the processor 1322 to communicate with the Internet or one or more intranets. With such a network connection, it is contemplated that the processor 1322 might receive information from the network, or might output information to the network in the course of performing the above-described method operations. Such information, which is often represented as a sequence of instructions to be executed using processor 1322, may be received from and outputted to the network, for example, in the form of a computer data signal embodied in a carrier wave.

The processor 1322 executes instructions, codes, computer programs, scripts which it accesses from hard disk, floppy disk, optical disk (these various disk based systems may all be considered secondary storage 1324), flash drive, ROM 1326, RAM 1328, or the network connectivity devices 1332. While only one processor 1322 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture 1320 to provide the functionality of a number of servers that is not directly bound to the number of computers in the technical architecture 1320. In an embodiment, the functionality disclosed above may be provided by executing the application and/or applications in a cloud computing environment. Cloud computing may comprise providing computing services via a network connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 1322, the RAM 1328, and the ROM 1326 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiment can be made within the scope and spirit of the present invention.

The invention claimed is:

1. A method, implemented with a processor of a computer apparatus, to manage transactions of a payment card, the method including:
   obtaining images associated with a payment transaction for a payment amount associated with the payment card;
   performing a payment authorization for the payment transaction;
   defining a first priority for a first image of the images, and a second priority for a second image of the images, wherein the first priority is higher than the second priority;
   storing, in a database, a payment transaction record, the payment transaction record comprising the payment amount and a reminder data file associated with the payment transaction, the reminder data file comprising the images and the first and second priorities;
   forming a transaction statement file listing the payment transaction relating to the payment card, the transaction statement file containing linking data associated with the payment transaction, wherein the reminder data file is accessible to a user using the linking data, wherein the user is associated with the payment card;
   transmitting the transaction statement file to a user device of the user;
   receiving an indication that the linking data associated with the payment transaction has been selected by the user;
   in response to receiving the indication, extracting the reminder data file from the database;
   identifying that the first priority is higher than the second priority to select the first image; and
   electronically transmitting in a first transmission to the user device, the first image to the user device while bypassing inclusion of the second image in the first transmission to cause the first image to be displayed on the user device,
   wherein the displayed first image on the user device reflects the obtained images that were captured by cameras in a retail location associated with a merchant to which a payment was made, while a purchaser was moving around the retail location prior to the purchaser initiating a purchase at a point-of-sales terminal in the retail location.

2. The method according to claim 1, wherein images form at least one video.

3. The method according to claim 1, wherein the images comprise at least one captured image of the user,
   wherein the method further comprises:
   receiving an indication that the user has provided a data input requesting a further image; and
   sending, based on the second priority, a second transmission including the second image in response to the indication that the user has provided the data input.

4. The method according to claim 1, wherein the images are captured by a camera of a point-of-sales terminal.

5. The method according to claim 1, wherein the images include images captured by a closed-circuit television camera.

6. The method according to claim 1, wherein the obtaining the images is performed by a computer server implementing an online store, and arranged for communication with the user over a communication network.

7. The method according to claim 6, wherein the images include at least one image of a webpage presented to the user.

8. A method, implemented with a processor of a computer apparatus, of informing a user of payment transactions made using a payment card associated with the user, the method comprising:
   receiving payment transaction data characterizing payment transactions;
   receiving reminder data files associated with the payment transactions, wherein a first reminder data file of the reminder data files is associated with a first payment transaction of the payment transactions, the first reminder data file comprising a plurality of images that are associated with the first payment transaction, the first reminder data file including a first priority for a first image of the plurality of images, and a second priority for a second image of the plurality of images, wherein the first priority is higher than the second priority;

storing the reminder data files in a database;

identifying among the payment transactions, one or more payment transactions relating to the payment card, wherein the one or more payment transactions includes the first payment transaction;

forming a transaction statement file listing the one or more payment transactions identified as relating to the payment card, the transaction statement file containing respective linking data associated with each of the listed one or more payment transactions, wherein the linking data relates to accessing the one or more reminder data files associated with the one or more payment transactions;

electronically transmitting the transaction statement file to a user device of the user;

receiving an indication that the linking data associated with the first payment transaction has been selected by the user;

in response to receiving the indication, extracting the first reminder data file from the database;

identifying that the first priority is higher than the second priority to select the first image;

transmitting in a first transmission to the user device, the first image to the user device while bypassing inclusion of the second image in the first transmission to cause the first image to be displayed on the user device, wherein the displayed first image reflects images that were captured by cameras in a retail location associated with a merchant to which a payment was made, while a purchaser was moving around the retail location prior to the purchaser initiating a purchase at a point-of-sales terminal in the retail location.

9. The method according to claim 8, wherein the plurality of images form a video.

10. The method according to claim 8, wherein the plurality of images comprise an image of the user, wherein the method further comprises:
receiving an indication that the user has provided a data input requesting a further image; and
sending, based on the second priority, a second transmission including the second image from the plurality of images in response to the indication that the user has provided the data input.

11. At least one computer readable non-transitory storage medium comprising a set of executable program instructions, which when executed by a computing system, cause the computing system to:

obtain images associated with a payment transaction for a payment amount associated with a payment card;

perform a payment authorization for the payment transaction;

define a first priority for a first image of the images, and a second priority for a second image of the images, wherein the first priority is higher than the second priority;

store, in a database, a payment transaction record, the payment transaction record comprising the payment amount and a reminder data file associated with the payment transaction, the reminder data file comprising the images and the first and second priorities;

form a transaction statement file listing the payment transaction relating to the payment card, the transaction statement file containing linking data associated with the payment transaction, wherein the reminder data file is accessible to a user using the linking data, wherein the user is associated with the payment card;

transmit the transaction statement file to a user device of the user;

receive an indication that the linking data associated with the payment transaction has been selected by the user;

in response to the reception of the indication, extract the reminder data file from the database;

identify that the first priority is higher than the second priority to select the first image; and electronically transmit in a first transmission to the user device, the first image to the user device while bypassing inclusion of the second image in the first transmission to cause the first image to be displayed on the user device, wherein the displayed first image reflects the received images that were captured by cameras in a retail location associated with a merchant to which a payment was made, while a purchaser was moving around the retail location prior to the purchaser initiating a purchase at a point-of-sales terminal in the retail location.

12. The at least one computer readable storage medium of claim 11, wherein images form at least one video.

13. The at least one computer readable storage medium of claim 11, wherein the images comprise at least one captured image of the user, wherein the program instructions, when executed, cause the computing system to:
receive an indication that the user has provided a data input requesting a further image; and
send, based on the second priority, a second transmission including the second image in response to the indication that the user has provided the data input.

14. The at least one computer readable storage medium of claim 11, wherein the images are captured by a camera of a point-of-sales terminal.

15. The at least one computer readable storage medium of claim 11, wherein the images include images captured by a closed-circuit television camera.

16. The at least one computer readable storage medium of claim 11, wherein the images are obtained by a computer server implementing an online store, and arranged for communication with the user over a communication network.

17. The at least one computer readable storage medium of claim 11, wherein the images include at least one image of a webpage presented to the user.

* * * * *